US010198396B2

United States Patent
Zhang et al.

(10) Patent No.: US 10,198,396 B2
(45) Date of Patent: Feb. 5, 2019

(54) MASTER CONTROL BOARD THAT SWITCHES TRANSMISSION CHANNEL TO LOCAL COMMISSIONING SERIAL PORT OF THE MASTER CONTROL BOARD

(71) Applicant: ZTE Corporation, Shenzhen (CN)

(72) Inventors: Jian Zhang, Shenzhen (CN); Juan Li, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 267 days.

(21) Appl. No.: 14/908,457

(22) PCT Filed: Jun. 23, 2014

(86) PCT No.: PCT/CN2014/080550
§ 371 (c)(1),
(2) Date: Jan. 28, 2016

(87) PCT Pub. No.: WO2015/014175
PCT Pub. Date: Feb. 5, 2015

(65) Prior Publication Data
US 2016/0196232 A1    Jul. 7, 2016

(30) Foreign Application Priority Data

Jul. 29, 2013 (CN) .......................... 2013 1 0322546

(51) Int. Cl.
*G06F 13/00* (2006.01)
*G06F 13/42* (2006.01)
(Continued)

(52) U.S. Cl.
CPC ........ *G06F 13/4286* (2013.01); *G06F 13/364* (2013.01); *G06F 13/4022* (2013.01); *H04L 43/50* (2013.01); *G06F 8/60* (2013.01)

(58) Field of Classification Search
CPC .................................. G06F 13/42; G06F 8/60
See application file for complete search history.

(56) References Cited

U.S. PATENT DOCUMENTS 7,146,436 B1 * 12/2006 Manchester .............. G06F 8/60
710/10

FOREIGN PATENT DOCUMENTS

| CN | 101534223 A | 9/2009 |
| CN | 102006200 A | 4/2011 |
| CN | 102752166 A | 10/2012 |

OTHER PUBLICATIONS

Thereareabouts (Year: 2015).*
(Continued)

*Primary Examiner* — Tammara R Peyton
(74) *Attorney, Agent, or Firm* — Cantor Colburn LLP

(57) ABSTRACT

A commissioning method, a master control board, and a service board are provided. The method comprises: a master control board switching a transmission channel to a commissioning serial port and transmitting a commissioning enabling signal to a selected service board; and after the service board receives the commissioning enabling signal, the service board switching the transmission channel to a local commissioning serial port and performing commissioning processing with the master control board. The embodiments of the invention preserve the commissioning serial ports inside single boards (i.e., service boards) for commissioning single boards respectively as well as enable the serial ports of the master control board of a core switch system to perform serial communication conveniently with CPU of any single board of the core switch system.

12 Claims, 3 Drawing Sheets

(51) Int. Cl.
    *H04L 12/26*          (2006.01)
    *G06F 13/364*        (2006.01)
    *G06F 13/40*          (2006.01)
    *G06F 8/60*            (2018.01)

(56) References Cited

OTHER PUBLICATIONS

International Search Report for corresponding application PCT/CN2014/080550 filed on Jun. 23, 2014; dated Dec. 22, 2014.
Extended European Search Report Jun. 20, 2016 re: Application No. 14832493.2 (PCT/CN2014/080550); pp. 1-6, citing: US 7 146 436 B1.

\* cited by examiner

MASTER CONTROL BOARD THAT SWITCHES TRANSMISSION CHANNEL TO LOCAL COMMISSIONING SERIAL PORT OF THE MASTER CONTROL BOARD

TECHNICAL FIELD

The present invention relates to the communication field, and in particular to a commissioning method, a master control board, and a service board.

BACKGROUND

After 30 years' development, starting from 10 M, the bandwidth of the Ethernet has gone through 100 M, 1000 M, 10 G, 40 G, and 100 G development stages. At the present stage, the 10 GE bandwidth Ethernet has already been used in batch, and the 40 GE and 100 GE bandwidth Ethernet have been gradually applied. Therefore, it raises a requirement for a core switch which bears the development of the bandwidth of the Ethernet. In order to support and satisfy the demand for constructing the data center under the new circumstances, the switch system, as in the central position of the core switch, becomes a critical equipment. The most important properties of the core switch are high density and high bandwidth.

A certain model of a core switch system is applied in a data center, and the single boards of the core switch system can be classified into the master control board, a switch board and a line-card according to their respective functions. The master control board completes the management and control function of the whole system, while the switch board and the line-card complete the large volume data exchanging function. In order to increase the performance the high-speed link, the architecture of the certain model of a core switch employs the advanced orthogonal architecture in the industry. The single boards which compose the system are of high quantity, compact-sized, and can be plugged in both front and back. During the system commissioning and maintenance, the serial port lines need to be switched frequently between each single board, which affects the efficiency of the commissioning and maintenance. However, the serial ports are indispensable to either the commissioning of each single board's function or the commissioning and maintenance of the overall switch system.

SUMMARY

The technical problem solved by the embodiments of the invention is to provide a commissioning method, master control board, and service board, which can conveniently commission any of service boards of a core switch system through serial ports of a master control board of the core switch system.

In order to solve the technical problem, the embodiments of the invention provide a commission method, comprising: a master control board switching a transmission channel to a commissioning serial port and transmitting a commissioning enabling signal to a selected service board; and after the service board receives the commissioning enabling signal, the service board switching the transmission channel to a local commissioning serial port and performing commissioning processing with the master control board.

The method further comprises the characteristics as follows: the master control board transmitting a commissioning enabling signal to a selected service board, comprising: the master control board translating the commissioning enabling signal to a bus level signal and transmitting the bus level signal to the selected service board through a bus.

The method further comprises the characteristics as follows: the service board performing commissioning processing with the master control board, comprising: the service board translating a RS232 commissioning signal to the bus level signal and transmitting the bus level signal to the master control board through the bus; after the master control board receives the bus level signal, the master control board translating the bus level signal to the RS232 commissioning signal.

The method further comprises the characteristics as follows: the bus comprising: a RS485 bus.

In order to solve the technical problem, the embodiments of the invention further provide a master control board, wherein, comprises:

a control module, set to control a switch from a transmission channel to a commissioning serial port;

a transmitting module, set to transmit the commissioning enabling signal to a selected service board;

The master control board further comprises the characteristics as follows: The master control board further comprising: a translation module, set to translate the commissioning enabling signal into a bus level signal; wherein the transmitting module is further set to transmit the bus level signal to the selected service board through a bus.

The master control board further comprises the characteristics as follows: the transmitting module is further set to after receiving the bus level signal transmitted by the service board, transmitting the bus level signal to the translation module; the translation module is further set to translate the received the bus level signal into a RS232 commissioning signal.

In order to solve the technical problem, the embodiments of the invention further provide a service board, comprises: a transmitting module, set to receive the commissioning enabling signal from a master control board and transmit the enabling signal to a control module; the control module, set to switch a transmission channel to a local commissioning serial port and perform a commissioning processing with the master control board.

The service board further comprises the characteristics as follows: a translation module, set to translate a RS232 commissioning signal of the commissioning serial port into a bus level signal and transmit the bus level signal to the transmitting module; wherein the transmitting module is further set to transmit the bus level signal to the master control board through a bus.

The service board further comprises the characteristics as follows: the service board comprising:

a switchboard and/or a line card.

To summarize, the embodiments of the invention provide a commissioning method, a master control board, and a service board. The embodiments of the invention preserve the commissioning serial ports inside single boards (i.e., service boards) for commissioning single boards respectively as well as enable the serial ports of the master control board of the core switch system to perform serial communication conveniently with CPU of any single board of the core switch system. Therefore, the embodiments of the invention not only ensure the serial port commissioning function of each single board itself, but also provide the convenience for the system-level commissioning and maintenance of a switch, therefore, the efficiency of systematical commissioning and maintenance is enhanced.

BRIEF DESCRIPTION OF THE ACCOMPANYING DRAWINGS

DETAILED DESCRIPTION OF THE EMBODIMENTS

In order to make the objectives of the invention, the technical solutions and advantages more clearly and understandable, the embodiments of the present invention will be described hereinafter in detail in conjunction with the drawings thereof. It needs to note that the embodiments of the present invention and the features in the embodiments can be arbitrarily combined with each other if there is no conflict.

Figure 1:
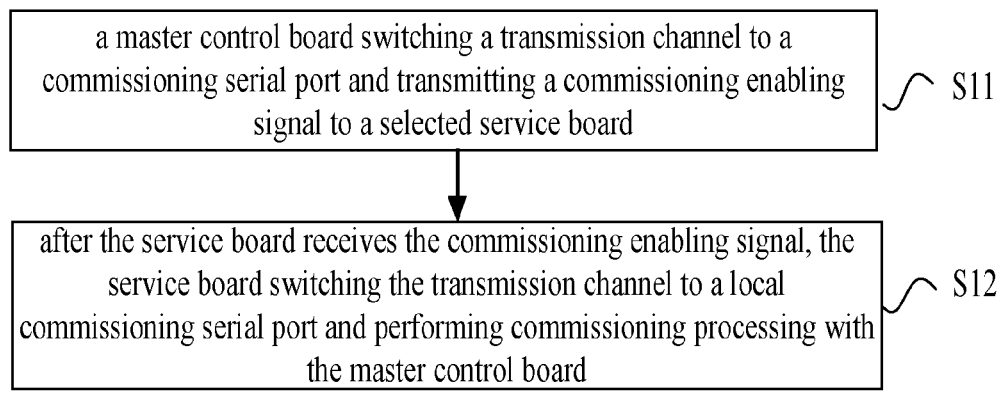
FIG. 1 is a flow chart of a commissioning method according to the embodiments of the present invention.

FIG. 1 is a flow chart of a commissioning method according to the embodiments of the present invention. As shown in FIG. 1, the method of the present embodiment includes:

Process S11, a master control board switching a transmission channel to a commissioning serial port and transmitting a commissioning enabling signal to a selected service board; and Process S12, after the service board receiving the commissioning enabling signal, the service board switching the transmission channel to a local commissioning serial port and performing commissioning processing with the master control board.

The commissioning method of the embodiment of the present invention is convenient for serial port commissioning of a switch system, especially for serial port commissioning of a core switch system with large scale and high density.

Figure 2:
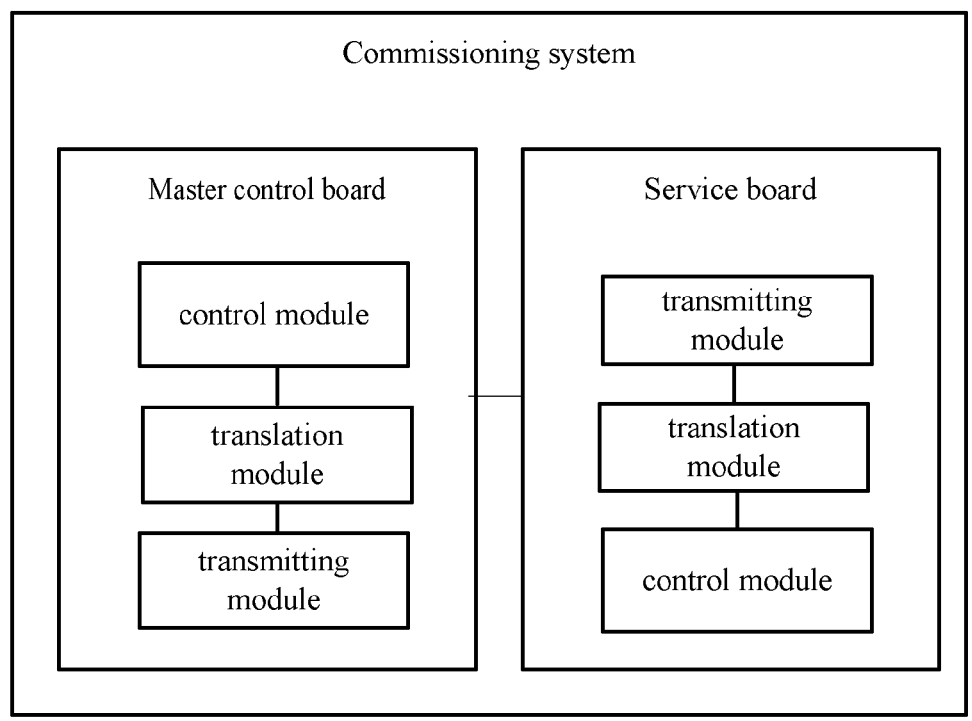
FIG. 2 is a schematic diagram of a commissioning system according to the embodiments of the present invention.

FIG. 2 is a schematic diagram of a commissioning system according to the embodiments of the present invention. As shown in FIG. 2, the commissioning system of the present embodiment includes: a master control board and one or more service boards, the master control board, set to switch a transmission channel to a commissioning serial port and transmit a commissioning enabling signal to a selected service board;

the service board, set to after receiving the commissioning enabling signal, switch the transmission channel to a local commissioning serial port and perform commissioning processing with the master control board.

Wherein the master control board includes:

control module, set to control a switch from a transmission channel to a commissioning serial port;

transmitting module, set to transmit the commissioning enabling signal to a selected service board;

In an alternative embodiment, the master control board further includes:

translation module, set to translate the commissioning enabling signal to a bus level signal;

transmitting module, further set to transmit the bus level signal to the selected service board through a bus.

In an alternative embodiment, the transmitting module, further set to after receiving the bus level signal transmitted by the service board, transmit the bus level signal to the translation module;

The translation module, further set to translate the received bus level signal to a RS232 commissioning signal.

Wherein the service board includes:

transmitting module, set to receive the commissioning enabling signal from a master control board and transmit the enabling signal to a control module;

the control module, set to switch a transmission channel to a local commissioning serial port and perform a commissioning processing with the master control board.

In an alternative embodiment, the service board further includes:

a translation module, set to translate a RS232 commissioning signal of a commissioning serial port into a bus level signal and transmit the bus level signal to the transmitting module;

the transmitting module, further set to transmit the bus level signal to the master control board through a bus.

Wherein the service board includes: a switchboard and/or a line card.

In an alternative embodiment, the bus includes: RS485 bus. There are certainly other buses except for RS485 bus.

Figure 3:
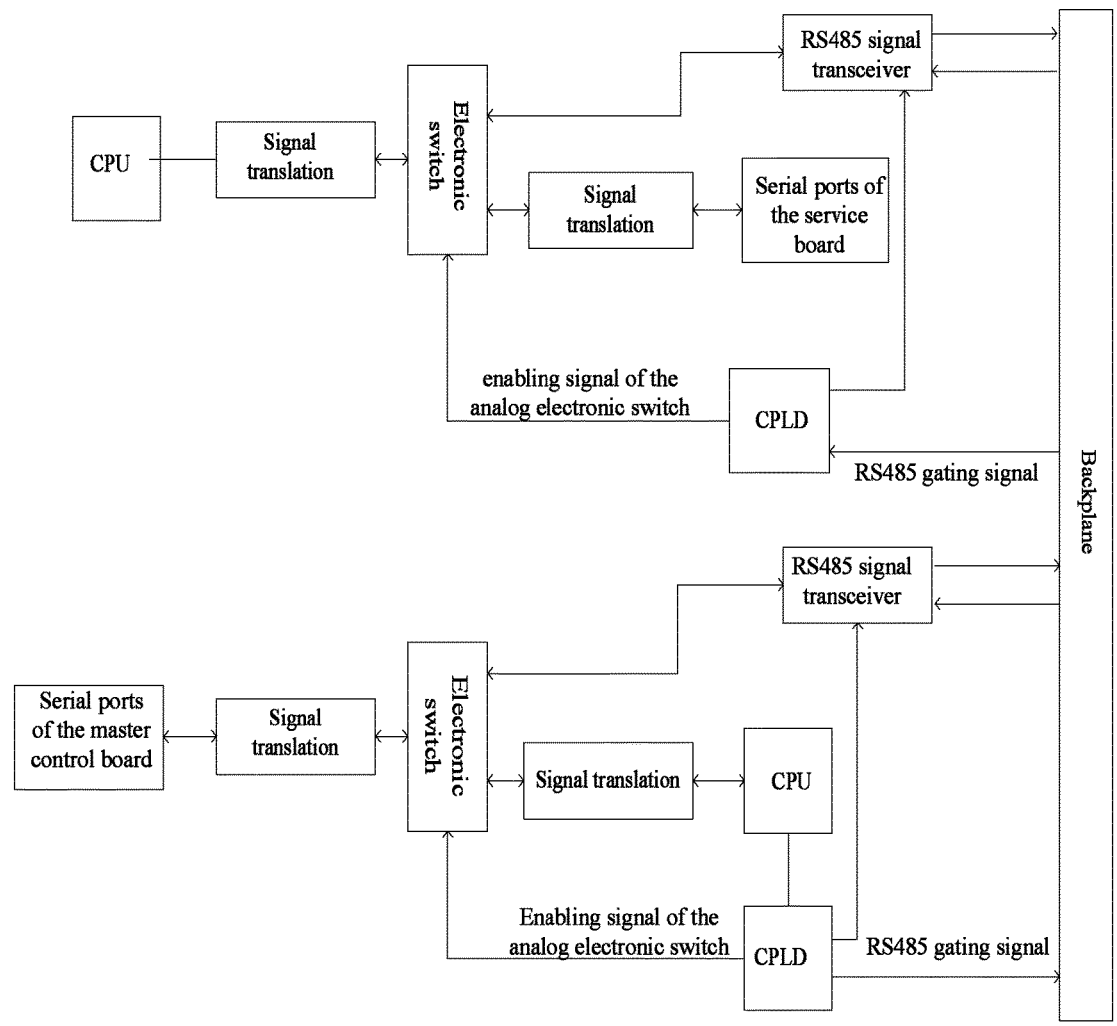
FIG. 3 is a schematic diagram of a circuitry of the commissioning system based on the RS485 bus according to the embodiments of the present invention.

FIG. 3 is a schematic diagram of a circuitry of the commissioning system based on the RS485 bus according to the embodiments of the present invention. In this alternative embodiment, the commissioning system based on the RS485 bus may include: a set of full duplex RS485 buses (equals the abovementioned transmitting module), a signal level translation module (equals the abovementioned translation module), a serial port switch control module (equals the abovementioned control module).

The RS485 bus is a set of full duplex RS485 buses, which act as a "signal vehicle" to realize the interconnection of each single board of a core switch system through the backplane of the core switch system. The RS485 can also realize the cross board transmission of the serial port signal within each single board of the core switch system after the level translation of the serial port signal.

The signal level translation module includes a RS232 signal transceiver and a RS485 signal transceiver. Wherein the RS232 signal transceiver accomplishes the level translation between the RS232 signal and the Low-Voltage Positive-referenced Emitter Coupled Logic (LVPEL) signal, the RS485 signal transceiver accomplishes the level translation between the RS485 signal and the LVPECL signal.

The analog switch device is used to perform the selection of a signal transmission channel. Specifically, in a serial port switch system, the selection of the signal transmission channel means to select a transmission channel of which the direction of the serial port signal transmission is from the service board CPU to the serial ports of the service board and from the backplane to the master control board through the RS485 bus.

The Complex Programmable Logic Device (CPLD) logic chips of each single board consist of the serial port switch control module. The serial port switch control module can perform the control function of an overall serial port switch system.

An alternative embodiment of the present invention is provided as follows to give a further detailed description of the method of the present invention.

In the core switch system, the master control board acts as a center for the serial port switch system, while the switch board and the line card act as nodes. The serial port communication is conducted among the RS232 serial ports of the master control board and each node within the serial port switch system. The following would describe in detail about the application of the present invention in the core switch system from the perspectives of the service board and the master control board respectively.

Firstly, the service board serves as a reference object. Starting from the RS232 interface of the service board CPU, as shown in the upper portion of FIG. 3: the RS232 signal of the service board CPU firstly need to go through a RS232 serial port signal transceiver which translates the RS232 signal to LVPECL signal. The LVPECL signal translated from the RS232 signal of the service board CPU, after going through a 2-channel analog electronic switch, could choose two channels. The LVPECL signal in one channel goes through the RS232 transceiver again to restore to a RS232 level signal which then is transmitted to a RJ45 interface of the service board, and the LVPECL signal in the other channel need to be translated to a RS485 level signal via a RS485 signal transceiver, and then the RS485 level signal is transmitted to the master control board.

As shown in the lower portion of FIG. 3, the master control board serves as a reference object. Starting from the RS232 serial ports of the master control board, an example of receiving the serial port signal is presented. There are two input signals corresponding to the analog electronic switch, one is the RS232 signal from the master control board CPU, similarly, the RS232 signal need to go through the RS232 transceiver twice to realize level translation. The other input signal is the serial port signal of the service board CPU, after going through the signal translation and the 2-channel analog electronic switch, the serial port signal is transmitted to the master control board by using RS485 bus as the "signal vehicle".

As shown in FIG. 3, the control module of the serial port switch system consists of the CPLD logic chips of each single board. Control signals include a RS485 gating signal and an enabling signal of the analog electronic switch. Acting as the center of the switch system, the master control board sends the RS485 gating signal to choose a certain service board of the switch system to conduct serial port communication with. After receiving the RS485 gating signal, the service board could control the enable of the analog electronic switch through the CPLD logic chips, so as to realize the gating of the serial port signal channel.

To summarize, according to the embodiments of the commissioning system, when only commissioning single boards, by connecting the serial port line to the RJ45 interface directly, a computer could be used to commission single boards. When commissioning the switch system, by connecting the serial port line to the serial port of the master control board, it could realize the detection and commissioning of serial ports of any single board, including the master control board, within the switch system.

Compared with the Ethernet switch system devices which don't possess any intelligent switch system, the commissioning system of the embodiment of the present invention not only ensure the serial port commissioning function of the single board itself, but also could avoid the complication of switching frequently between each single board of the system when commissioning the system. Therefore, the efficiency of the commissioning of the switch system is improved and the system could be configured and maintained conveniently.

Those skilled in the art understand that all or part of the processes of the abovementioned method could be implemented through relevant hardware instructed by programmable codes. The programmable codes could be stored in the computer-readable medium, such as read-only memory, a magnetic disk or an optical disc and the like. Alternatively, all or part of the processes of the abovementioned embodiments could be implemented by one or more integrated circuits. Accordingly, the module or unit of the abovementioned embodiments could be implemented by hardware or by software functional modules. The present invention is not limited to any specific combination of hardware and software.

The foregoing is merely preferred embodiment of the present application. Obviously, the present invention could have many other embodiments. Those skilled in the art could make various corresponding modifications and variations according to the present invention, while these corresponding modifications and variations should fall within the protection scope of the present invention.

The present invention relates to the communication field, and in particular to a commissioning method, a master control board, and a service board, wherein the method includes: Switching, by a master control board, a transmission channel to a commissioning serial port and transmitting a commissioning enabling signal to a selected service board; and after the service board receiving the commissioning enabling signal, the service board switching the transmission channel to a local commissioning serial port and performing commissioning processing with the master control board. The embodiments of the invention preserve the commissioning serial ports inside the single boards (i.e., service boards) for commissioning the single boards respectively as well as enable the serial ports of the master control board of the core switch system to conduct serial communication conveniently with any single board CPU of the core switch system. Therefore, the embodiments of the invention not only ensure the commissioning function of the serial port of each single board itself, but also provide the convenience for the system-level commissioning and maintenance of the switch, therefore, the efficiency of the systematical commissioning and maintenance is enhanced.

What is claimed is:

1. A method for commissioning, comprising:
   a master control board switching a transmission channel to a commissioning serial port of the master control board and transmitting a commissioning enabling signal to a selected service board; and
   after the service board receives the commissioning enabling signal, the service board switching the transmission channel to a local commissioning serial port and performing commissioning processing with the master control board.

2. The method according to claim 1, wherein the master control board transmitting a commissioning enabling signal to a selected service board comprises:
   the master control board translating the commissioning enabling signal to a bus level signal and transmitting the bus level signal to the selected service board through a bus.

3. The method according to claim 2, wherein the service board performing commissioning processing with the master control board comprises:
   the service board translating a RS232 commissioning signal to the bus level signal and transmitting the bus level signal to the master control board through the bus;
   after the master control board receives the bus level signal, the master control board translating the bus level signal to the RS232 commissioning signal.

4. The method according to claim 2, wherein the bus comprises: a RS485 bus.

5. A master control board, comprising:
- a control module, set to control a switch from a transmission channel to a commissioning serial port of the master control board;
- a transmitting module, set to transmit a commissioning enabling signal to a selected service board;
- wherein the master control board is further set to:
- perform commissioning processing with the service board after the service board receives the commissioning enabling signal and switches the transmission channel to a local commissioning serial port.

6. The master control board according to claim 5, wherein the master control board further comprises:
- a translation module, set to translate the commissioning enabling signal into a bus level signal;
- wherein the transmitting module is further set to transmit the bus level signal to the selected service board through a bus.

7. The master control board according to claim 6, wherein the transmitting module is further set to, after receiving the bus level signal transmitted by the service board, transmit the bus level signal to the translation module;
- the translation module is further set to translate the bus level signal received into a RS232 commissioning signal.

8. A service board, comprising:
- a transmitting module, set to receive a commissioning enabling signal from a master control board and transmit the commissioning enabling signal to a control module, wherein the commissioning enabling signal is sent to the transmitting module by the master control board after the master control board switches a transmission channel to a commissioning serial port of the master control board;
- the control module, set to switch a transmission channel to a local commissioning serial port and perform a commissioning processing with the master control board.

9. The service board according to claim 8, wherein the service board further comprises:
- a translation module, set to translate a RS232 commissioning signal of the commissioning serial port to a bus level signal and transmit the bus level signal to the transmitting module;
- wherein the transmitting module is further set to transmit the bus level signal to the master control board through a bus.

10. The service board according to claim 8, wherein, the service board comprises:
- a switchboard and/or a line card.

11. The method according to claim 3, wherein the bus comprises: a RS485 bus.

12. The service board according to claim 9, wherein the service board comprises:
- a switchboard and/or a line card.

* * * * *